Patented Oct. 14, 1924.

1,511,418

UNITED STATES PATENT OFFICE.

ANGUS MACLACHLAN, OF PERTH AMBOY, NEW JERSEY, ASSIGNOR TO MACLACHLAN REDUCTION PROCESS CO., OF NEW YORK, N. Y., A CORPORATION OF DELAWARE.

PROCESS OF TREATING SEWAGE SLUDGE.

No Drawing. Application filed April 12, 1922. Serial No. 551,939.

*To all whom it may concern:*

Be it known that I, ANGUS MACLACHLAN, a citizen of the United States, residing at Perth Amboy, New Jersey, have invented certain new and useful Improvements in Processes of Treating Sewage Sludge, of which the following is a clear, full, and exact description.

My invention relates to the purification and dehydration of sewage, and more particularly to the treatment of sewage sludge. By sludge, I mean sewage from the mains which has been preliminarily treated to cause a more or less separation of the solid or semi-solid materials from the purely liquid content, and in which the liquid content has been reduced somewhat. Various methods have heretofore been proposed to cause such a separation, and one of the methods at present in use is that known as the activated sludge method of sewage disposal. This, as is well known, consists in conducting the sewage from the mains into tanks which are provided with means for introducing air to the sewage to be treated, the passage of air through this sewage aiding in the development of microscopic aerobic organisms which in the course of their growth oxidize the soluble solids in the sewage which then separate as flocculent gelatinous material. The sewage thus treated is usually then run into a settling tank or successively into settling tanks, where it is allowed to remain a sufficient time for the solids to settle to the bottom, the more or less pure water being decanted or otherwise removed from the top.

As a result of this, or equivalent preliminary treatment of sewage, the water content is reduced to such an extent that, whereas the proportion of solid matter to water in sewage is about 1 to 4000, in sludge the proportion of solid to liquid is only 1 to 200.

It is to the treatment of this sludge that this application is particularly directed.

A serious problem which presents itself, however, is the matter of handling large quantities of very light sludge which is produced by the process above outlined. This sludge is ordinarily entirely innocuous as removed from the treatment plant, but it is highly putrescible, that is, the organisms contained therein rapidly die when not kept in contact with ample air and food. Consequently the problem of disposing of the sludge without nuisance has been a serious problem and undoubtedly has been one of the chief draw-backs to more general adoption of the activated sludge process.

By virtue of its gelatinous and putrescible nature, this sludge will not yield to any of the usual commercial methods of removing water, such as filter-presses, centrifuges and the like. It is evident that some method of conditioning or pre-treating this sludge in order to change the physical and biological characteristics must be employed before there can be great hope of economical dewatering.

The sludge which remains has been in the past treated in a number of ways to recover the fertilizing content and sometimes the grease and ammonia products, but great difficulty has heretofore been experienced in causing a further separation of the solid materials from the sludge, which at this stage contains in excess of 95% of water. It is not feasible to subject this activated sludge to a prolonged settling process, otherwise the growth of anaerobic organisms is permitted and these soon kill or greatly weaken the aerobic bacteria, resulting in putrefaction of the mass.

It has been proposed to raise the temperature of this sludge to 30° C. or 40° C. and to treat it with sulphuric acid to aid in coagulating its more or less flocculent particles, and afterwards screening, filtering and drying the resultant product. On account, however, of the enormous quantities of water still contained in the sludge, this process is expensive, and it has been found in practice that the cloths used in filtering are soon clogged. Furthermore, a sludge cake which has been produced by treatment with sulphuric acid has been found difficult to dry since it has a tendency to retain its water content.

Furthermore, when the sludge is treated with sulphuric acid there is a disadvantage, due to the corrosive effect on the pipes, machinery and other equipment used.

By the present invention, I so treat the sludge after activation that not only is its bacteria rendered innocuous but at the same time its gelatinous nature is broken down so that the resulting material will be more amenable to dewatering.

For this purpose I prefer to use a gas having both a sterilizing and ionizing action, and I have found that sulphur dioxide is eminently suitable for this purpose, which may be cheaply supplied, as required, by the burning of crude sulphur in a suitable type of burner.

The advantage of using a gaseous re-agent for conditioning this sludge, is the fact that its introduction into a tank containing the sludge to be treated causes more or less violent agitation of the tank contents with the result that the entire mass is thoroughly impregnated with the re-agent in a very short period of time, causing the bacteria to be rendered innocuous, and a thorough diffusion of the electrolytic agent so that coagulation of the colloidal solids is practically instantaneous.

In the practice of my invention, activated sludge is withdrawn from the treatment plant proper and subjected to sedimentation for a relatively short period to remove any free water from the sludge, by decantation. The sludge thus obtained is then introduced into a treatment tank of convenient size and shape, preferably a vertical, cylindrical tank with a hopper bottom. This treatment tank may be so designed that the treatment of sludge can be conducted on either a continuous or an intermittent basis. Since the sterilizing and electrolytic gas is quite soluble in the water content of the sludge, the size and shape of the treatment tank are not very important provided ordinary precautions are taken to insure intimate contact between the gas and sludge. For this reason I prefer to introduce the raw sludge flow at or near the top of the tank, withdrawing it at or near the bottom, and at the same time introducing the gas through perforated pipes or grids at or near the bottom, allowing it to pass up through the flowing sludge in counter-current direction giving maximum contact. In some cases I may prefer to place three such tanks in series to eliminate a possibility of "short circuiting" and this arrangement enables me to treat at a high rate of flow.

Almost immediately upon the sulphur dioxide coming into contact with the sludge material a breaking down of the gelatinous nature of the solid constituents of the sludge takes place. The treatment is continued until this breaking down is complete, the time depending upon the amount of gas mixture admitted and the quantity of material to be treated, after which the gas may be stopped and the tank contents allowed to settle. Preferably, however, the tank contents is passed on to a settling tank where an instantaneous precipitation of the solids takes place, with the decantation of clear water, giving a reduction in the volume of sludge solids by about 60%. The sludge solids thus withdrawn are substantially sterile in nature, with no offensive odor and are further more so changed in physical character that they may be easily further dewatered by filter-pressing, centrifuging, draining on sand beds, etc. In some cases I prefer to draw direct from the treatment tank to the next dewatering stage such as filter presses, in order to avoid the delay entailed by final sedimentation. This further treatment may consist in draining, pressing, drying or any combination of these steps, to still further reduce the liquid content.

The effect of applying the gas mixture to the sludge appears to produce therein an electrostatic change which converts the gelatinous solids into a more or less granular or porous form and in this form the excessive water content may be easily decanted or syphoned off and the residue more economically, quickly and conveniently pressed or dried.

My invention also contemplates treating the activated sludge or the sludge formed in any other manner with $SO_2$ and steam preferably by aspirating the fumes of burning sulphur with live steam. This may be most advantageously done in an apparatus of the kind shown and described in my Patent #1,359,086, dated November 16, 1920.

Whether, however, the sludge is treated with $SO_2$ or the $SO_2$ and steam, the general procedure is substantially the same, as already outlined, and in either case there is no visible evidence of free acids being liberated during or after the gas treatment. The beneficial effects of my treatment seem to be due to an electrolytic and germicidal action of sulphur dioxide under conditions in which it is used, rather than to a chemical reaction.

Sewage sludge, particularly activated sludge which has been treated by the sterilizing and electrolytic gas process described above, is considerably changed in physical character and in suitable shape for final dewatering. The free water may be readily drained therefrom by passing the treated sludge onto some draining apparatus such as a sand bed, fine screen, etc., or, if it is preferred, the treated sludge may be introduced into the standard filter press, where it readily builds up a firm solid cake and with minimum clogging of the press cloths. Having reduced the water by either draining or pressing, the resultant sludge cake is in excellent condition for final drying in a suitable dryer since it is more or less porous in nature and gives up its moisture quickly on the application of heat. The dried product is easily disintegrated into desirable form for marketing as a fertilizer.

An additional advantage resulting from my treatment process is the fact that considerable nitrogen compounds are saved, due to the fact that sterilization of bacteria prevents decomposition and gaseous evolution of nitrogen compounds, and also due to the fact that calcium salts contained in the sludge tend to dissolve and pass off in the filter liquor, thereby resulting in enrichment of the nitrogen content of the final sludge. This effect of my treatment is highly important since one of the purposes of an activated sewage treatment plant is to produce a marketable fertilizer which may more or less pay for the cost of sewage treatment. Since the fertilizing value of the sludge is directly dependent upon its nitrogen content, it will be seen that any treatment which tends to increase same will have a direct bearing on the value of the sludge. In actual practice I have found that the fertilizer produced from activated sludge which has been treated by my process contains as high as 75% more ammonia than sludge produced without any treatment and contains as high as 40% more ammonia than sludge which has been treated with acids such as sulphuric.

This application is a continuation in part of my application Serial #482,254, filed July 2, 1921, and allowed October 12, 1921.

What I claim as new is—

1. The method of treating activated sludge which consists in bringing the sludge into intimate contact with sulphur dioxide for a sufficient time to break down the gelatinous nature of the solid constituents of the sludge.

2. The method of treating activated sludge which consists in bringing the sludge into intimate contact with sulphur dioxide for a sufficient time to retard or destroy the putrefactive tendency of the sludge and to break down the gelatinous nature of the solid constituents thereof.

3. The method of treating sewage sludge which consists in bringing the sludge into contact with hot sulphur dioxide and steam for a sufficient time to break down the gelatinous nature of the solid constituents of the sludge.

4. The method of treating sewage sludge which consists in bringing the sludge into contact with hot sulphur dioxide and steam for a sufficient time to retard or destroy the putrefactive tendency of the sludge and to break down the gelatinous nature of the solid constituents thereof.

5. The method of dehydrating and purifying sewage sludge which consists in preliminarily separating the organic matter from the water to form a sludge and then treating the sludge thus formed with sulphur dioxide for a sufficient time to break down the gelatinous nature of the solid constituents thereof.

6. The method of dehydrating and purifying sewage sludge which consists in preliminarily separating the organic matter from the water to form a sludge and then treating the sludge thus formed with sulphur dioxide for a sufficient time to retard or destroy the putrefactive tendency of the sludge and to break down the gelatinous nature of the solid constituents thereof.

7. The method of dehydrating activated sludge which consists in treating the same with sulphur dioxide for a sufficient time to break down the gelatinous nature of the solid constituents thereof, settling the resulting product, and removing the separated water.

8. The method of dehydrating activated sludge which consists in treating the same with sulphur dioxide for a sufficient time to break down the gelatinous nature of the solid constituents thereof, settling the resulting product, and removing the separated water and drying the residue.

9. The method of dehydrating activated sludge which consists in treating the same with sulphur dioxide for a sufficient time to break down the gelatinous nature of the solid constituents thereof, settling the resulting product, and removing the separated water and pressing the residue.

10. The method of dehydrating activated sludge which consists in treating the same with sulphur dioxide for a sufficient time to break down the gelatinous nature of the solid constituents thereof, settling the resulting product, removing the separated water and pressing and drying the residue.

11. The method of treating sewage sludge, which consists in bringing the sludge into contact with hot $SO_2$ and steam, for a sufficient time to cause separation of the solid constituents of the sludge.

12. The method of treating activated sludge which consists in bringing the sludge into contact with hot $SO_2$ and steam, for a sufficient time to cause separation of the solid constituents of the sludge.

13. The method of dehydrating and purifying sewage which consists in preliminarily separating the organic matter from the water to form a sludge and then treating the sludge thus formed with hot $SO_2$ and steam for a sufficient time to cause separation of the solid constituents of the sludge.

14. The method of dehydrating sewage sludge which consists in treating the same with hot $SO_2$ and steam for a sufficient time to cause separation of the solid constituents of the sludge, settling the resultant product, and removing the separated water.

15. The method of dehydrating sewage sludge which consists in treating the same with hot $SO_2$ and steam for a sufficient time to cause separation of the solid constituents of the sludge, settling the resultant product, removing the separated water, and drying the residue.

16. The method of dehydrating sewage sludge which consists in treating the same with hot $SO_2$ and steam for a sufficient time to cause separation of the solid constituents of the sludge, settling the resultant product, removing the separated water, and pressing the residue.

17. The method of dehydrating sewage sludge which consists in treating the same with hot $SO_2$ and steam for a sufficient time to cause separation of the solid constituents of the sludge, settling the resultant product, removing the separated water, pressing and drying the residue.

Signed at New York city, New York, this 11th day of April, 1922.

ANGUS MACLACHLAN.